UNITED STATES PATENT OFFICE.

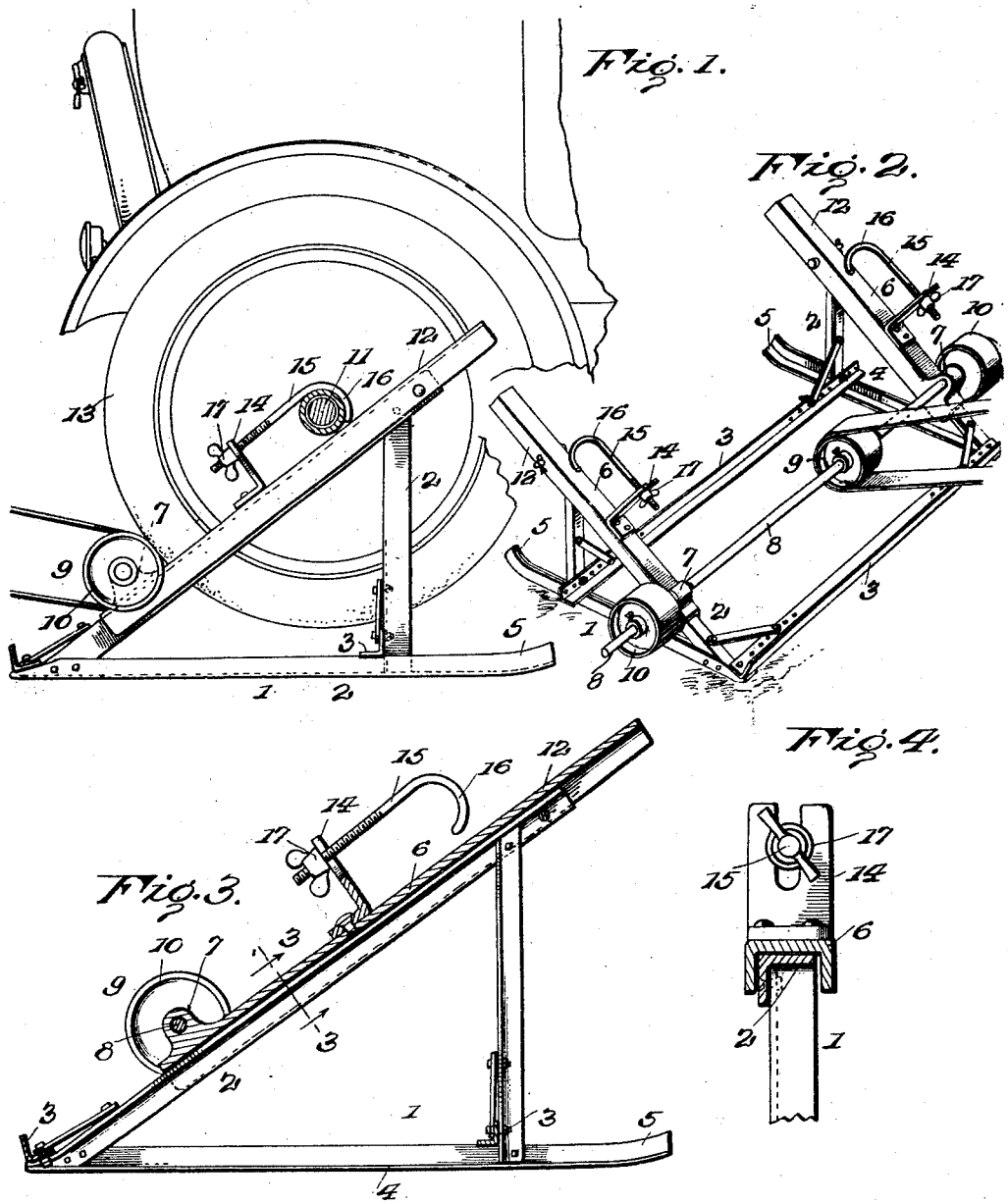

GUY L. WILLITS, OF MINNEAPOLIS, MINNESOTA, ASSIGNOR, BY MESNE ASSIGNMENTS, TO THE BELT POWER UNIT CORPORATION, OF MINNEAPOLIS, MINNESOTA, A CORPORATION OF MINNESOTA.

PORTABLE POWER UNIT.

1,366,618.     Specification of Letters Patent.     Patented Jan. 25, 1921.

Application filed January 20, 1920. Serial No. 352,741.

*To all whom it may concern:*

Be it known that I, GUY L. WILLITS, a citizen of the United States of America, residing at 4224 Aldrich Ave. So., Minneapolis, in the county of Hennepin and State of Minnesota, have invented certain new and useful Improvements in Portable Power Units, of which the following is a specification.

This invention relates particularly to a portable power unit, adapted previously for coöperation with a motor vehicle so as to utilize the power wheels of such vehicle as a power means for the unit.

The improved unit comprises a base frame of particular construction on which is pivotally supported a lever frame carrying the power transmitting elements. The frames are particularly constructed for a simple and expeditious association of the unit with the vehicle, and are also so connected as to permit a self-adjustment to avoid frictional binding of the operating parts.

The invention also contemplates a means whereby the frictional engagement of the vehicle drive wheels and the operating means of the power unit may be increased at will.

In the drawings:

Figure 1 is a rear view illustrating the application and use of the improved power unit.

Fig. 2 is a perspective view of the unit.

Fig. 3 is a longitudinal section of the unit.

Fig. 4 is a section on line 3—3 of Fig. 3.

The improved portable power unit comprises a base frame 1, made up of triangular side frames 2 connected by cross and diagonal brace rods or bars 3. The bottom bars 4 of the side frames 2, constitute the ground engaging bars of the structure and are wholly without obstruction on their lower surfaces, and have their forward ends upturned at 5, to avoid interference in initially applying the unit.

Pivotally mounted at 6' on the base frame 1, preferably at the forward ends of the upper bars of the side frames 2, are the longitudinal bars 6 of the lever frame. These bars 6 are of inverted U form so as to embrace the upper bars of the side frame, being however of greater width in their recessed faces than are the upper bars of such side frames. The pivotal connections of the bars 6 are such as to permit lateral play of such bars 6, so that said bars may adjust themselves to irregularities as will later appear.

Bearing boxes 7 are mounted on the rear ends of the bars 6, and a power shaft 8 is mounted in and extends in both directions beyond such boxes 7.

A belt pulley 9 is adjustably held on shaft 8, as by the usual set screw, and driving rolls 10 are similarly secured on the shaft beyond the boxes.

In the use of the structure, the base frames are introduced beneath the rear axle 11 of a motor vehicle, the rear end of the lever frames having been swung upwardly on its pivots, until the forward projecting ends 12 of such bars 6 underlie the axle 11. A downward pressure on the rear ends of the bars 6, elevates the rear end of the vehicle, causing the rear axle and driving wheels (now free of the ground) to slide down the bars 6, until such wheels 13 bear frictionally upon the rolls 10 of the unit.

Operation of the drive wheels of the vehicle in the usual way, will now operate the belt pulley 9 from which power may be taken for any desired work.

Owing to the comparative flexibility of the mounting of the lever frame, the power shaft, when the weight of the car is against the rolls 10, will seek its own alinement, as the bars 6 are wholly independent of each other except through the shaft. Obviously, therefore no bending of such shaft in the boxes can result from any unusual position of the vehicle or base frame due to the surface supporting the unit.

Provision is made for increasing the frictional bearing of the vehicle wheels on the rolls 10 beyond that incident to the weight of the vehicle, through brackets 14, secured to the bars 6 below the possible position of the axle, through which brackets extend rods 15, having hook ends 16 to engage the axle. The ends of the rods 15 are threaded to receive adjusting members 17, adapted to bear against the brackets and draw the axle toward the power shaft 8 to any extent desired. This of course increases the bearing contact of the vehicle drive wheels on the rolls 10.

The rolls 10 and belt pulley 9 are adjustable on the shaft 8, and may be given any desired position for the best results. The shaft 8 may be of such length that the belt pulley 9 may be secured on one end thereof beyond the adjacent roll 10, thereby giving a power drive for an endless belt.

It is also preferred that the base frame be transversely adjustable, that is capable of being given various widths to adapt the unit for different types of vehicles. This is readily carried out by making the connections of the brace bars 3 removable and adjustable in an obvious manner.

Claims:

1. A portable power unit for use with motor vehicles comprising a base frame having ground engaging bars, a lever frame comprising side bars loosely pivoted on the base frame, said lever frame being adapted to support the axle of an automobile, and a power shaft mounted on said side bars to be operated by the wheels of the supported axle, said lever frame being of length to support the axle between the pivot of the side bars and the power shaft when the wheels on said axle are in engagement with said power shaft.

2. A portable power unit comprising a base frame of triangular form, a lever frame comprising side bars and a power shaft connecting said bars, the side bars being independently connected to the base frame for limited play relative to such base frame.

3. A portable power unit comprising triangular side frames, brace bars connecting said side frames, a bar pivotally mounted on each side frame for limited lateral play relative thereto, a power shaft rotatably supported in said bars, and driving rolls on said shaft.

4. A portable power unit comprising triangular side frames, brace bars connecting said side frames, a bar pivotally mounted on each side frame for limited lateral play relative thereto, a power shaft rotatably supported in said bars, and driving rolls on said shaft, the bars being extended forwardly of their pivotal mounting.

5. A portable power unit comprising triangular side frames, brace bars connecting said side frames, a bar pivotally mounted on each side frame for limited lateral play relative thereto, a power shaft rotatably supported in said bars, and driving rolls on said shaft, and means to engage a vehicle axle and draw the same toward the power shaft.

6. A portable power unit comprising triangular side frames, brace bars connecting said side frames, a bar pivotally mounted on each side frame for limited lateral play relative thereto, a power shaft rotatably supported in said bars, and driving rolls on said shaft, and rods adapted to engage the axle, and means for adjusting said rods relative to the power shaft.

7. A portable power unit for use with motor vehicles comprising a frame having inclined upper bars, lever bars pivotally connected to said upper bars adjacent the highest ends thereof, and a power shaft mounted in and arranged transversely of said lever bars, the power shaft forming the sole connection between the lever bars, and said lever bars being mounted for limited play relative to the upper bars of the frame.

8. A portable power unit for use with motor vehicles comprising a frame having inclined upper bars, a lever bar pivotally connected to each upper bar adjacent the highest point of the latter, a power shaft supported in said lever bars, the distance between the power shaft and pivots of the lever bars providing for positioning an axle of a motor vehicle on the same side of the lever bar pivots as the power shaft.

In testimony whereof I affix my signature.

GUY L. WILLITS.